United States Patent
Kuze

[11] Patent Number: 5,831,729
[45] Date of Patent: Nov. 3, 1998

[54] SPECTROMETER

[75] Inventor: Akihiko Kuze, Tokyo, Japan

[73] Assignee: NEC Corporation, Tokyo, Japan

[21] Appl. No.: 21,320

[22] Filed: Feb. 10, 1998

[30] Foreign Application Priority Data

Feb. 14, 1997 [JP] Japan .................................. 9-029887

[51] Int. Cl.$^6$ ........................................................ G01J 3/18
[52] U.S. Cl. ............................................. 356/328; 356/305
[58] Field of Search ................................. 356/305, 326, 356/328, 331, 334

[56] References Cited

FOREIGN PATENT DOCUMENTS

| | | |
|---|---|---|
| 57-54824 | 4/1982 | Japan . |
| 61-14527 | 1/1986 | Japan . |
| 62-277527 | 12/1987 | Japan . |
| 4-190123 | 7/1992 | Japan . |
| 6-207853 | 7/1994 | Japan . |

OTHER PUBLICATIONS

Heath, et al. "The Solar Backscatter Ultraviolet and Total Ozone Mapping Spectrometer (SBUV/TOMS) for NIMBUS G", Optical Engineering, vol. 14, Jul.–Aug. 1975, pp. 323–332.

*Primary Examiner*—F. L. Evans
*Attorney, Agent, or Firm*—Whitham, Curtis & Whitham

[57] ABSTRACT

It is the objective of the present invention to provide a spectrometer of which the modulation transfer function (MTFs) in a spectral direction and in a direction perpendicular to the spectral direction is enhanced for all wavelengths ranging from the short to the long. For a spectrometer according to the present invention, a spherical face is employed for collimating and condensing light in a spectral direction, instead of the spherical collimator/condenser that is used for a conventional spectrometer, and troidal faces in a non-spherical shape, such as in a paraboloidal shape, are provided for collimating and condensing in a direction perpendicular to the spectral direction. The focusing distance on the non-spherical face is a distance so calculated that the modulation transfer function is improved for all the wavelengths ranging from the short to the long. In addition, a detector is inclined at such an angle that the modulation transfer function is improved for all the wavelengths ranging from the short to the long.

6 Claims, 4 Drawing Sheets

20
LONG WAVE LENGTH IMAGE

19
MIDDLE WAVE LENGTH IMAGE ↕ SPECTRAL DIRECTION

18
SHORT WAVE LENGTH IMAGE

↔ PERPENDICULAR DIRECTION TO SPECTRAL DIRECTION

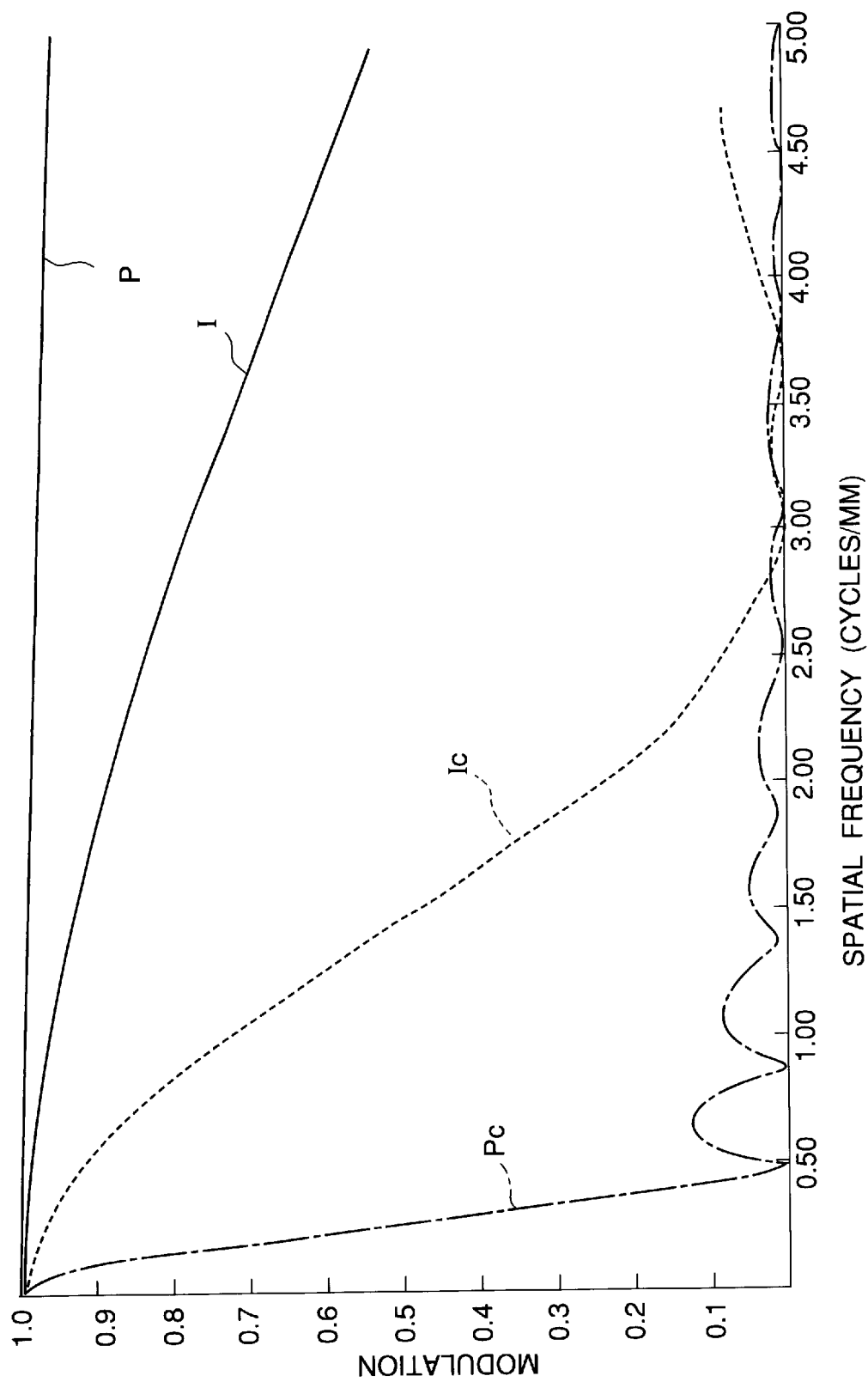

SPECTROMETER

BACKGROUND OF THE INVENTION

1. Field of the Invention

The present invention relates to a spectrometer, and in particular to a polychrometer type spectrometer that increases overall imaging accuracy when spectra in a sequentially large wavelength range are simultaneously measured.

2. Related Arts

A well known conventional spectrometer that sequentially and simultaneously measures optical spectra in a constant large wavelength range comprises, as is shown in FIG. 4, an incident slit 1, a collimator/condenser 2, an optical system constituted by a dispersion device, such as a diffraction grating, and a detector 4 whereat a plurality of photoelectric converters are aligned along a line. With this structure, the spectrometer simultaneously acquires a plurality of spectra, even though only one detector 4 is provided. An example spectrometer employing this system is described in "The Solar Backscatter Ultraviolet and Total Ozone Mapping Spectrometer (SBUV/TOMS)," NIMBUS G, Optical Engineering 14, 323–332, 1975.

As is shown in FIG., 4, the optical system employs a spherical mirror 2 having functions of a collimator and a condenser(collimator/condenser). Light entering through the incident slit 1 is changed to parallel light beams by the collimator/condenser 2, and the parallel light beams are then split by the dispersion device 3, such as a diffraction grating. The wavelengths obtained by splitting form images on the detector 4, beginning at the lower portion, in the order a short wavelength 5, a middle wavelength 6 and a long wavelength 7.

In FIG. 5 are shown images formed by split light beams when the optical system in FIG. 4 is employed. As is apparent from FIG. 5, none of the images provided by the wavelengths spread in the spectral direction, and preferable spectral characteristics are obtained. However, it has also been found that it is desirable for an image 8 provided by a short wavelength to spread in both the spectral direction and in the perpendicular direction, while the sizes of an image 9 provided by the middle wavelength and an image 10 provided by the long wavelength increase. When these images are to be simultaneously acquired by an array detector for which multiple photoelectric devices are aligned in a spectral direction, and if the size of the devices is adjusted to the size of the image for the short waveform, the image for the long wavelength will be canceled and a quantity of light will be lost. If the sizes of the devices are adjusted to the size of the image provided by the long waveform, the light receiving areas of the devices must be increased. Since the noise generated at the detector increases as the size of the light receiving area is increased, the signal-to-noise ratio is lowered.

Optical systems for improving imaging performance by limiting the processing to a specific wavelength are described in Japanese Unexamined Patent Publication Nos. Hei 6-207853, Sho 62-277527, Sho 57-54824 and Sho 61-14527. These optical systems, however, do not adequately attain the objective of simultaneously obtaining spectral images across a wide wavelength range. An optical system for simultaneously acquiring spectra is disclosed in Japanese Unexamined Patent Publication No. Hei 4-190123, but it does not have a superior imaging performance in the direction perpendicular to the spectral direction.

As is described above, the image for a long wavelength, which is formed by the conventional spectrometer, spreads perpendicular to the spectral direction.

SUMMARY OF THE INVENTION

It is, therefore, one objective of the present invention to provide a spectrometer of which the modulation transfer function (MTFs) in a spectral direction and in a direction perpendicular to the spectral direction is enhanced for all wavelengths ranging from the short to the long.

To achieve the above objective, for a spectrometer according to the present invention, a spherical face is employed for collimating and condensing light in a spectral direction, instead of the spherical collimator/condenser that is used for a conventional spectrometer, and troidal faces in a non-spherical shape, such as in a paraboloidal shape, are provided for collimating and condensing in a direction perpendicular to the spectral direction.

In the spectrometer of the present invention, the focusing distance on the non-spherical face is a distance so calculated that the modulation transfer function is improved for all the wavelengths ranging from the short to the long.

In addition, in the spectrometer of the present invention, a detector is inclined at such an angle that the modulation transfer function is improved for all the wavelengths ranging from the short to the long.

BRIEF DESCRIPTION OF THE DRAWINGS

FIG. 6 is a graph showing a comparison of the imaging characteristics for a long wavelength as provided by the spectrometer of the present invention and the conventional spectrometer.

DETAILED DESCRIPTION OF THE PREFERRED EMBODIMENT

The preferred embodiment of the present invention will now be described while referring to the accompanying drawings.

Figures 1, 2:
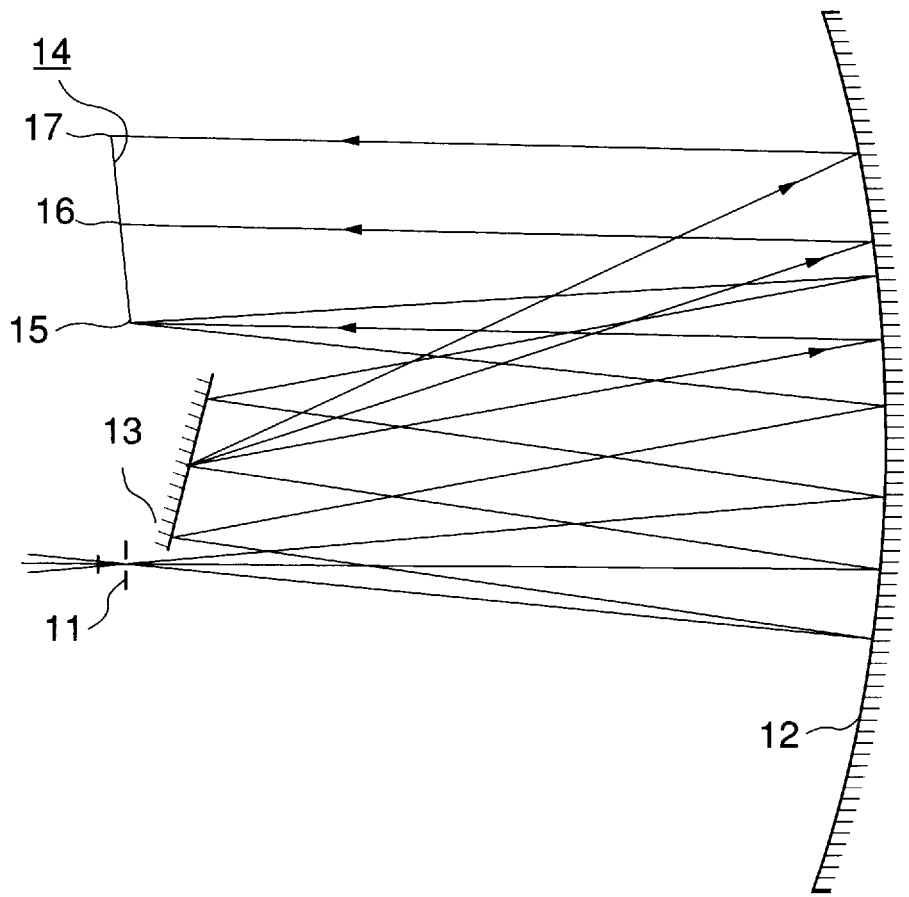
FIG. 1 is a front view of a spectrometer according to one embodiment of the present invention.
FIG. 2 is a diagram illustrating an example imaging performance according to the present invention.

FIG. 1 is a front view of a spectrometer illustrating one embodiment of the present invention. The spectrometer of the present invention comprises: an incident slit 11; a mirror 12 having functions of a collimator and a condenser (collimator/condenser); a dispersion device 13, such as a diffraction grating; and a detector 14.

Light that is to be measured passes through the incident slit 11 before being split, and is changed to parallel light beams at the collimator/condenser 12. The parallel light beams are split to obtain separate wavelengths by the dispersion device 13, such as a diffraction grating, and the split light beams are collected by the collimator/condenser 12 and focused on the surface of the detector 14. When a light beam having a wide wavelength range is split, images are formed on the detector 14, beginning at the lower portion, in the order a short wavelength 15, a center wavelength 16 and a long wavelength 17.

In FIG. 2 are shown spectral images formed according to this embodiment of the present invention illustrated in FIG. 1. It has been found that the total modulation transfer function (MTF) is improved for all the wavelengths ranging from the short to the long.

Figure 3:
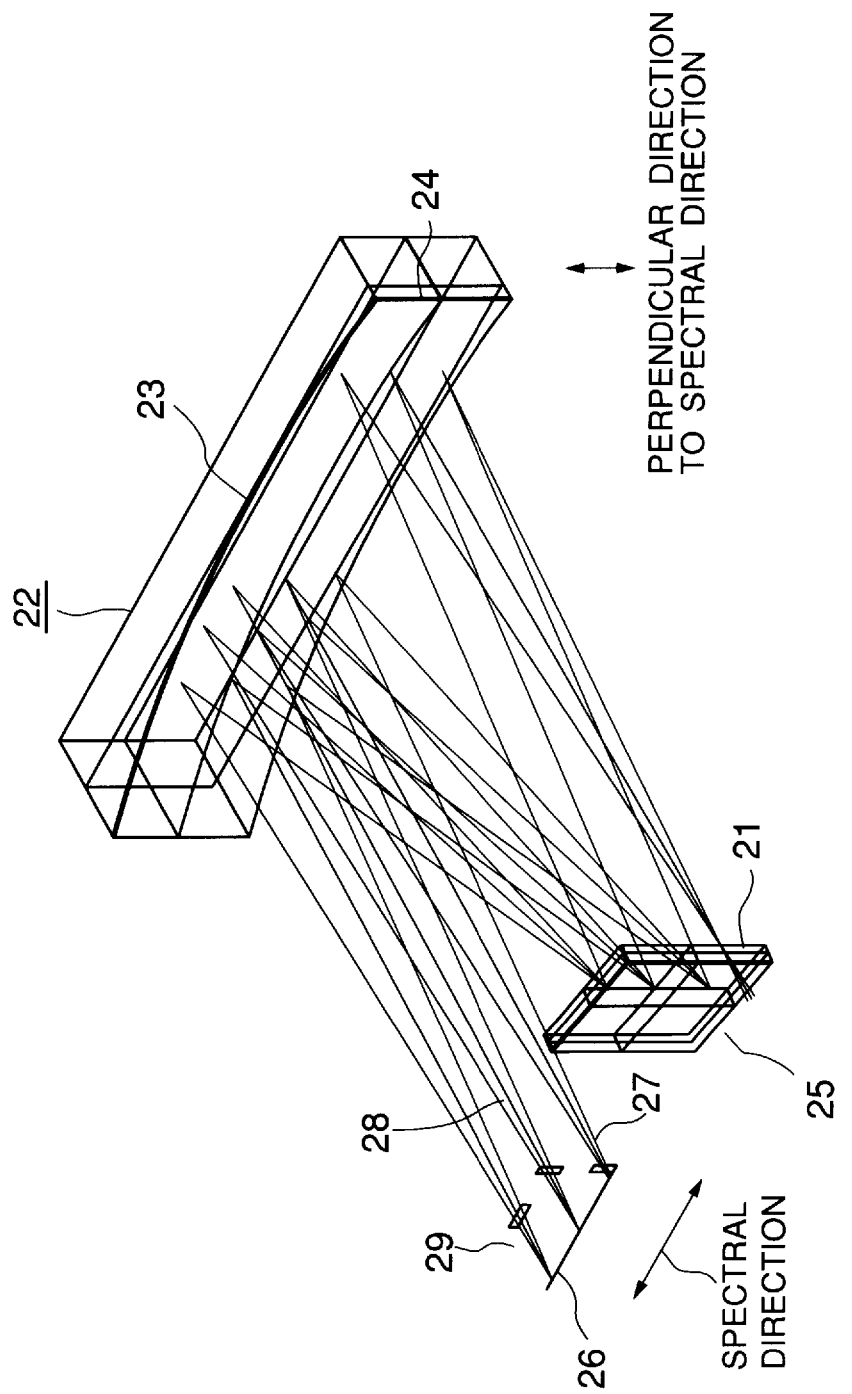
FIG. 3 is a perspective view of the spectrometer according to the embodiment of the present invention.
Figure 4:
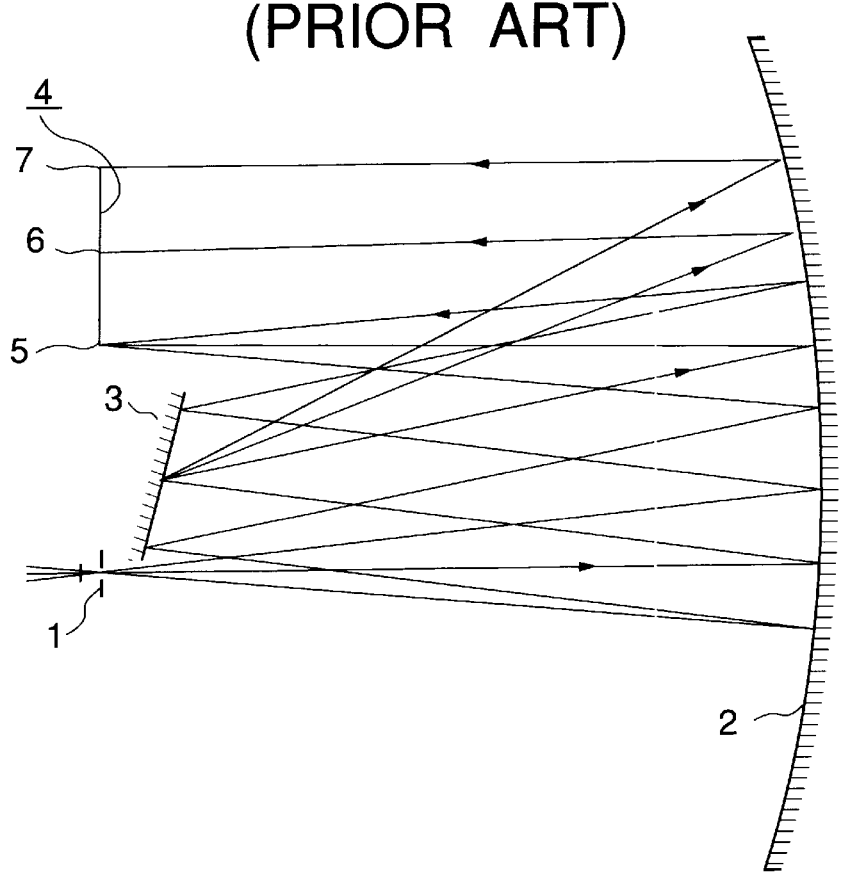
FIG. 4 is a diagram illustrating a conventional spectrometer.
Figure 5:
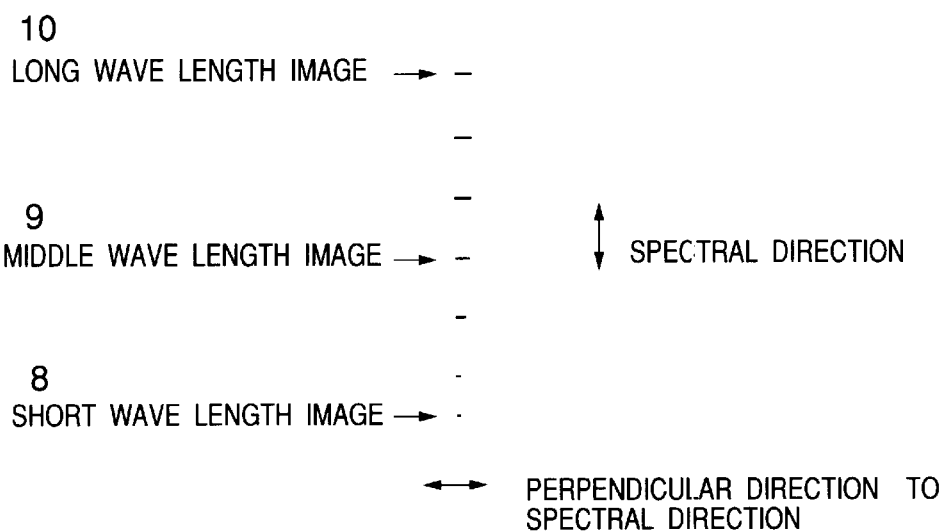
FIG. 5 is a diagram illustrating an example imaging performance of the conventional spectrometer.

FIG. 3 is a perspective view of the spectrometer according to the embodiment of the present invention, and shows the shape of the collimator/condenser 12. As is shown in FIG. 3, for the spectrometer of the present invention, the face of the collimator/condenser 12 (FIG. 1) has a spherical shape in the spectral direction so as to improve the imaging performance in that direction, and the face perpendicular to the spectral direction has a non-spherical shape, especially, a paraboloidal shape, so that the spreading of the image in a direction perpendicular to the spectral direction is prevented for all wavelengths ranging from the short to the long.

Furthermore, according to the present invention, the focusing distance at the paraboloid perpendicular to the spectral direction is slightly shorter than the focusing distance at the spherical face in the spectral direction, so that the imaging performance can be improved for all the wavelengths ranging from the short to the long.

In addition, since the detector 14 (FIG. 1) is so inclined that the long wavelength side is further from the collimator/condenser 12, the imaging performance can be improved for all the wavelengths ranging from the short to the long.

FIG. 6 is a graph showing the modulation transfer function in a spectral direction on the wavelength side, and the modulation transfer function in a direction perpendicular to the spectral direction for the spectrometer of both the present invention and the conventional spectrometer. The solid lines represent the modulation transfer functions in the spectral direction; solid line P showing the results provided by the conventional spectrometer and I the results provided by the present invention. A chained line PC represents the conventional modulation transfer function in a direction perpendicular to the spectral direction, and a broken line IC represents the modulation transfer function of the present invention in a direction perpendicular to the spectral direction. At this time, in the embodiment the focusing distance at the spherical mirror is 500 mm in the spectral direction, and the focusing distance at the paraboloidal mirror is 490 mm in the perpendicular direction.

It is preferable that the values in FIG. 6 not be lowered even if a spatial frequency is increased, and it has been found that the modulation transfer function in the direction perpendicular to the spectral direction is considerably improved compared with that of the conventional function.

The spectrometer of the present invention simultaneously acquires sequential spectra across a wide wavelength range, and provides a superior modulation transfer function for all the wavelengths ranging from the short to the long both in the spectral direction and in the perpendicular direction, so that a high signal-to-noise ratio can be provided at a high resolution and with no loss of a light quantity.

What is claimed is:

1. A spectrometer comprising:
   an incident slit;
   an optical device having functions of a collimator and a condenser;
   a dispersion element; and
   a detector,
   wherein said optical device has a spherical face in a spectral direction and has a non-spherical face in a direction perpendicular to said spectral direction.

2. A spectrometer according to claim 1, wherein a focusing distance (a radius of said spherical face) in said spectral direction differs from a focusing distance on said non-spherical face in said perpendicular direction.

3. A spectrometer according to claim 1, wherein said non-spherical face is a paraboloidal shape.

4. A spectrometer according to claim 2, wherein said focusing distance at said non-spherical face is shorter than said focusing distance at said spherical face.

5. A spectrometer according to claims 1, wherein said detector for receiving light in a specific wavelength range is obliquely located relative to incident light reflected from said optical device.

6. A spectrometer according to claim 5, wherein said detector is so inclined that a distance travelled is increased relative to a long wavelength.

* * * * *